(12) United States Patent
Arita et al.

(10) Patent No.: US 12,351,724 B2
(45) Date of Patent: Jul. 8, 2025

(54) INK SET, AND METHOD FOR PRODUCING LAMINATE

(71) Applicants: Manabu Arita, Tokyo (JP); Shunsuke Kobayashi, Kanagawa (JP)

(72) Inventors: Manabu Arita, Tokyo (JP); Shunsuke Kobayashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 523 days.

(21) Appl. No.: 17/654,703

(22) Filed: Mar. 14, 2022

(65) Prior Publication Data

US 2022/0306885 A1    Sep. 29, 2022

(30) Foreign Application Priority Data

Mar. 23, 2021 (JP) .................................. 2021-048453

(51) Int. Cl.
*C09D 11/40*  (2014.01)
*B41J 2/01*   (2006.01)
(Continued)

(52) U.S. Cl.
CPC .............. *C09D 11/40* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2015/0054885 A1* | 2/2015 | Sugiyama | D06P 1/525 347/21 |
| 2015/0065603 A1* | 3/2015 | Thornberry | C09D 11/38 523/122 |

(Continued)

FOREIGN PATENT DOCUMENTS

| JP | 2010-506748 | 3/2010 |
| JP | 2011-230501 | 11/2011 |

(Continued)

OTHER PUBLICATIONS

Notice of Submission of papers for Japanese Patent Application No. 2021-048453, mailed on May 14, 2024, 7 pages with English translation.

(Continued)

*Primary Examiner* — Manish S Shah
(74) *Attorney, Agent, or Firm* — Grüneberg and Myers PLLC

(57) ABSTRACT

Provided is an ink set including a first ink and a second ink. The second ink contains a high-viscosity component having a viscosity of 500 mPa·s or higher at 25 degrees C., and a low-viscosity component having a viscosity of 30 mPa·s or lower at 25 degrees C. A static surface tension $\gamma 1$ (mN/m) of the first ink and a static surface tension $\gamma 2$ (mN/m) of the second ink satisfy General formula (1) below.

$$-1 \text{ (mN/m)} \leq \gamma 1 - \gamma 2 \leq 5 \text{ (mN/m)} \qquad \text{General formula (1)}$$

A content A (% by mass) of each component contained in the first ink, a static surface tension B (mN/m) of each component contained in the first ink, a content C (% by mass) of each component contained in the second ink, and a static surface tension D (mN/m) of each component contained in the second ink satisfy General formula (2) below.

$$\Sigma A/\Sigma(A/B) - \Sigma C/\Sigma(C/D) \geq 0 \text{ (mN/m)} \qquad \text{General formula (2)}$$

10 Claims, 3 Drawing Sheets

(51) Int. Cl.
  *B41J 2/21* (2006.01)
  *B41M 5/00* (2006.01)
  *B41M 7/00* (2006.01)
  *C09D 11/101* (2014.01)
  *C09D 11/322* (2014.01)

(52) U.S. Cl.
  CPC .......... *B41M 5/0023* (2013.01); *B41M 7/009* (2013.01); *C09D 11/101* (2013.01); *C09D 11/322* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 2015/0115202 A1* | 4/2015 | Kagata | C09D 11/40 252/301.36 |
| 2015/0138271 A1* | 5/2015 | Fukuda | B41J 2/01 523/122 |
| 2015/0368491 A1 | 12/2015 | Araki | |
| 2016/0152849 A1* | 6/2016 | Nagai | B41J 2/1652 347/29 |
| 2016/0222236 A1* | 8/2016 | Nakagawa | C09D 11/324 |
| 2016/0222239 A1* | 8/2016 | Nakata | C09D 11/102 |
| 2016/0272834 A1* | 9/2016 | Kobayashi | C09D 11/40 |
| 2019/0134989 A1* | 5/2019 | Matsumoto | B41J 2/2117 |
| 2021/0071021 A1* | 3/2021 | Matsumoto | B41J 2/01 |
| 2021/0013881 A1 | 5/2021 | Manabu et al. | |
| 2021/0138817 A1* | 5/2021 | Arita | B41J 11/002 |

FOREIGN PATENT DOCUMENTS

| | | |
|---|---|---|
| JP | 2013-142104 A | 7/2013 |
| JP | 2013-230637 | 11/2013 |
| JP | 2014-173039 | 9/2014 |
| JP | 2015-205510 A | 11/2015 |
| JP | 2017-013506 | 1/2017 |
| JP | 2017-140845 | 8/2017 |
| JP | 2020-525620 | 8/2020 |
| JP | 2021-074992 | 5/2021 |
| WO | 2008/030555 | 3/2008 |
| WO | 2019/005798 | 1/2019 |

OTHER PUBLICATIONS

Sartomer Product Catalogue with partial English translation, 32 pages.
Office Action received in Japanese Application No. JP 2021-048453 mailed on Jan. 28, 2025, 5 pages with English translation.

* cited by examiner (a) 0.2s (b) 2s (c) 10s (d) 34s

INK SET, AND METHOD FOR PRODUCING LAMINATE

CROSS-REFERENCE TO RELATED APPLICATIONS

This patent application is based on and claims priority pursuant to 35 U.S.C. § 119(a) to Japanese Patent Application No. 2021-048453, filed on Mar. 23, 2021, in the Japan Patent Office, the entire disclosure of which is hereby incorporated by reference herein.

BACKGROUND

Technical Field

The present disclosure relates to an ink set, and a method for producing a laminate.

Description of the Related Art

Inkjet recording methods have simpler processes than other recording methods. Therefore, there are advantages that the inkjet recording methods can easily adapt to full-color operations and can obtain high-resolution images with simple apparatus configuration. Recently, the widespread inkjet printing methods, which can computer-process digital images and record the images easily on print media have been increasingly expanding their applications because the inkjet printing methods can produce accurate printed matters having a high visual catchiness and a high advertising effect for various fields such as printing industries, advertising industries, sign/display industries, various event industries, amusement industries, and construction/interior design industries.

As the inkjet inks, for example, solvent-based inkjet inks containing an organic solvent as a main component, water-based inkjet inks containing water as a main component, and active-energy-ray-curable inkjet inks containing a polymerizable monomer as a main component have been widely used so for.

SUMMARY

According to an embodiment of the present disclosure, an ink set includes a first ink and a second ink. The second ink contains a high-viscosity component having a viscosity of 500 mPa·s or higher at 25 degrees C., and a low-viscosity component having a viscosity of 30 mPa·s or lower at 25 degrees C. A static surface tension $\gamma 1$ (mN/m) of the first ink and a static surface tension $\gamma 2$ (mN/m) of the second ink satisfy General formula (1) below.

$$-1 \text{ (mN/m)} \leq \gamma 1 - \gamma 2 \leq 5 \text{(mN/m)} \quad \text{General formula (1)}$$

A content A (% by mass) of each component contained in the first ink, a static surface tension B (mN/m) of each component contained in the first ink, a content C (% by mass) of each component contained in the second ink, and a static surface tension D (mN/m) of each component contained in the second ink satisfy General formula (2) below.

$$\Sigma A/\Sigma(A/B) - \Sigma C/\Sigma(C/D) \geq 0 \text{ (mN/m)} \quad \text{General formula (2)}$$

According to an embodiment of the present disclosure, a method for producing a laminate using the above-described ink set includes: applying the first ink on a base material to form a first layer; applying the second ink on the first layer to form a second layer; and solidifying the first layer and the second layer by curing or drying, or both, to form a laminate.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
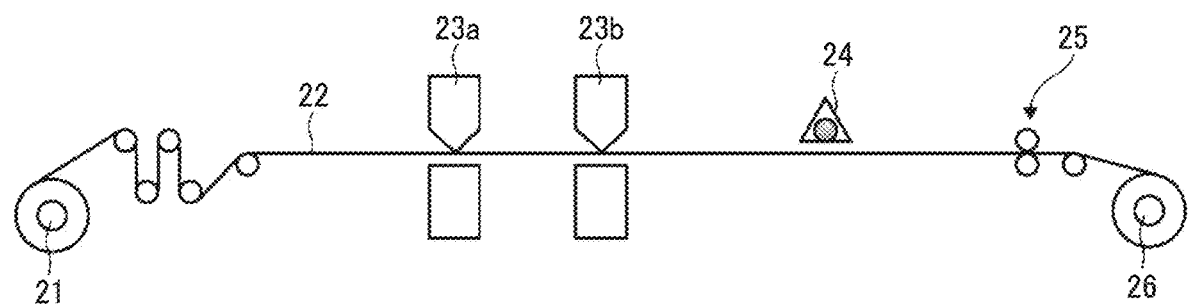
FIG. 1 is a diagram illustrating a printing apparatus equipped with an inkjet discharging device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In recent years, there has been an increasing need for accelerating the printing speed. Particularly when printing images for a plurality of layers to form a laminate, there is a problem that the printing operation is time-consuming because it includes steps of printing a lower layer, subsequently solidifying the lower layer, and printing an upper layer on the solidified lower layer. Hence, a proposed method prints the upper layer image on the lower layer while the lower layer is still in the liquid state. However, the proposed method cannot produce an upper image that covers the lower layer, develops a color at a high density, and can be retained without bleeding or spreading over time. Moreover, because of the difficulty with retaining an image over time, it has been impossible to apply the method to other inks than inks such as active-energy-ray-curable inks that have a high solidifying speed.

The present disclosure has an object to provide an ink set that has a high productivity and is intended for producing a laminate excellent in high-density color development and in retention of an upper layer image over time.

(Ink Set)

An ink set of the present disclosure includes a first ink and a second ink. The second ink contains a high-viscosity component having a viscosity of 500 mPa·s or higher at 25 degrees C., and a low-viscosity component having a viscosity of 30 mPa·s or lower at 25 degrees C. A static surface tension γ1 (mN/m) of the first ink and a static surface tension γ2 (mN/m) of the second ink satisfy General formula (1) below.

$-1$ (mN/m)≤γ1−γ2≤5(mN/m)  General formula (1)

A content A (% by mass) of each component contained in the first ink, a static surface tension B (mN/m) of each component contained in the first ink, a content C (% by mass) of each component contained in the second ink, and a static surface tension D (mN/m) of each component contained in the second ink satisfy General formula (2) below.

$\Sigma A/\Sigma(A/B)-\Sigma C/\Sigma(C/D) \geq 0$ (mN/m)  General formula (2)

<Static Surface Tension>

The static surface tension γ1 (mN/m) of the first ink and the static surface tension γ2 (mN/m) of the second ink satisfy General formula (1) below.

$-1$ (mN/m)≤γ1−γ2≤5(mN/m)  General formula (1)

When the value γ1-γ2 is less than −1 mN/m, a droplet of the second ink submerges into a first layer. When the value γ1-γ2 is greater than 5 mN/m, a droplet of the second ink continues spreading over a first layer over time. In the present disclosure, it is preferable that the surface tension difference be close to 0 mN/m in terms of image retention over time, and that the surface tension difference be a positive value in terms of covering a lower layer by making it hard for an ink droplet to submerge. When the value γ1-γ2 is a negative value, a droplet of the second ink does not necessarily submerge into a first layer. When the value γ1-γ2 is greater than or equal to −1 mN/m but less than 0 mN/m, a droplet of the second ink often submerges into a first layer, but may sometimes float above the first layer for unknown reasons, which may be the failure to measure the true value of the surface tension depending on the measuring method, or influences from other factors (e.g., specific gravity). That is, a static surface tension difference close to 0 mN/m is desirable when a hardly submerging landing behavior is obtained under the effect of the high-viscosity component, whereas a static surface tension difference more positively sided within the range up to 5 mN/m is desirable when the effect of the high-viscosity component is low.

The static surface tension of the inks or the components is measured with, for example, an automatic surface tensiometer (DY-300, available from Kyowa Interface Science Co., Ltd.) by a plate method using a platinum plate at 25 degrees C. However, when it is difficult to measure the static surface tension depending on properties, measuring methods such as a ring method and a pendant drop method may be appropriately selected. When the measurement target is a solid, examples of the measuring method include, but are not limited to, calculation of a critical surface tension. However, a solid component may be excluded from calculation.

According to the ink set of the present disclosure, the content A (% by mass) of each component contained in the first ink, the static surface tension B (mN/m) of each component contained in the first ink, the content C (% by mass) of each component contained in the second ink, and the static surface tension D (mN/m) of each component contained in the second ink satisfy General formula (2) below, preferably satisfy General formula (3) below, and more preferably satisfy General formula (4) below.

$\Sigma A/\Sigma(A/B)-\Sigma C/\Sigma(C/D) \geq 0$ (mN/m)  General formula (2)

$\Sigma A/\Sigma(A/B)-\Sigma C/\Sigma(C/D) \geq 3$ (mN/m)  General formula (3)

$\Sigma A/\Sigma(A/B)-\Sigma C/\Sigma(C/D) \geq 5$ (mN/m)  General formula (4)

When the ink set of the present disclosure satisfies General formula (2), it is possible to realize an ink set excellent in a covering ratio and image retention over time. In the present disclosure, "image retention over time" is not particularly limited and may be appropriately selected depending on the intended purpose, and means a time lag from ink droplet landing until curing, and an image being kept unchanged within the time lag when a plurality of inkjet heads (discharging apparatuses) or nozzle lines are used. Examples of "image retention over time" include, but are not limited to, a nozzle-to-nozzle distance of 12 mm, a UV head-to-UV head distance of 100 mm or greater but 2,000 mm or less, and a conveying speed of 50 mm/sec or higher but 2,000 mm/sec or lower. When a serial printer is used, examples of "image retention over time" include, but are not limited to, a time lag of some tens of seconds or shorter from image completion until UV irradiation.

As described above, in terms of the surface tensions of the inks, it is preferable that the first ink and the second ink have some surface tension balance. However, it is preferable that the static surface tension of the first ink be higher than the static surface tension of the second ink. This facilitates formation of tidy layers in a laminate to be obtained, high-density color development, and formation of tidy layers over time (FIG. 5, part (d)) even if the laminate includes an untidy layer interface due to, for example, partially submerging ink droplets (FIG. 5, parts (a) and (b)).

There is a need for balancing the surface tensions of the first ink and the second ink to some extent. On the other hand, examples of the method for making a surface tension difference between the constituent components include, but are not limited to, a method of making a surface tension difference between main components such as a monomer and a solvent and adjusting the surface tensions using a component such as a surfactant that can control the surface tensions even if used in a small amount.

It is preferable to make the ink set satisfy General formula (2) above, and on the other hand, to make a surface tension difference between the components except a trace component such as a surfactant. That is, the relationship between the components can be expressed as the average of the ratio between static surface tension and weight. It is preferable to calculate the value, component by component. However, there is no need for completely separating all components. There is no particular limit so long as General formula (2) is satisfied, and the components may be sorted into groups (i.e., some components may be kept as a mixture). Solid components are uninfluential and may be excluded from calculation.

<Viscosity>

The first ink and the second ink constituting the ink set of the present disclosure have a viscosity of 5 mPa·s or higher but 40 mPa·s or lower at 25 degrees C. It is preferable to discharge at least the second ink by an inkjet method in terms of forming an image as an upper layer, and that at least the second ink have a viscosity within the range described above. Even when the first ink has a low viscosity like the second ink, use of the present disclosure makes it hard for a droplet formed of the second ink to submerge into a first layer but makes it possible to obtain a landing behavior as if the droplet were crushed on the surface or a landing behavior as if the droplet mounted on the liquid surface. When the viscosity of the first ink is lower than 5 mPa·s, a droplet easily submerges and can hardly obtain the landing behaviors described above. That is, it is preferable that the first ink and the second ink both have a viscosity of from 5 mPa·s through 40 mPa·s at 25 degrees C. Moreover, provided that the discharging temperature is from 20 degrees C. through 65 degrees C., it is particularly preferable that the first ink and the second ink have a viscosity of from 6 mPa·s through 12 mPa·s at the mentioned discharging temperature. All steps can be performed by an inkjet method. The viscosity can be measured by a cone plate rotary viscometer VISCOMETER TVE-22L manufactured by TOKI SANGYO CO., LTD. using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

Examples of existing methods for forming an upper layer on a liquid-state lower layer include, but are not limited to, a common method of making a lower layer at a high viscosity and spreading an upper layer ink, and a method of making the surface tension of an upper layer ink lower than the surface tension of a lower layer ink and spreading the upper layer ink. The former method has a problem that it cannot employ an inkjet ink as the lower layer ink for the reason related with the viscosity, and the latter method has problems that the image spreads over time when layer formation is weighed, and that the upper layer cannot sufficiently cover the lower layer when image retention over time is weighed. Particularly when image retention over time is weighed, the easiness for an ink droplet of the upper layer to submerge into the lower layer immediately after landing is one factor that hinders satisfying both of coverage and image retention over time. Obtaining a hardly submerging landing behavior is considered one method for satisfying both of the above.

With the ink set of the present disclosure, it is hard for an ink droplet formed of the second ink to submerge into a first layer formed of the first ink when the ink droplet of the second ink is landed on the first layer, but it is possible to obtain a landing behavior as if the ink droplet of the second ink were crushed on the surface of the first layer (FIG. 3) or a landing behavior as if the ink droplet of the second ink mounted on the surface of the first layer (FIG. 4), and to place liquid droplets formed of the second ink in an arrangement on the first layer without collapsing a formed multilayer state or image shapes instead of making the liquid droplets spread over the surface instantaneously, and to satisfy both of coverage and image retention over time. Moreover, for example, when the second ink contains a pigment, a high image quality can be obtained over time because the image hardly spreads over time, and the pigment component hardly mixes and diffuses but can develop a color at a high density while maintaining sharpness. Because it is possible to obtain sharpness and density over time, it is possible to apply inks that need a long time to solidify, and a secured leveling time enables an even higher image quality.

(First Ink and Second Ink)

The first ink is used for being applied on a base material to form a first layer.

The second ink is used for being applied on the first layer to form a second layer.

The first ink preferably contains a monomer, a surfactant, a polymerization initiator, and particles, and further contains other components as needed. When curing the first ink with electron beams, the first ink may be free of the polymerization initiator.

The second ink contains a high-viscosity component having a viscosity of 500 mPa·s or higher at 25 degrees C. and a low-viscosity component having a viscosity of 30 mPa·s or lower at 25 degrees C., preferably contains a monomer, a surfactant, a polymerization initiator, and particles, and further contains other components as needed. When curing the second ink with electron beams, the second ink may be free of the polymerization initiator.

<High-Viscosity Component>

The high-viscosity component contained in the second ink is not particularly limited and may be appropriately selected depending on the intended purpose so long as the viscosity of the high-viscosity component at 25 degrees C. is 500 mPa·s or higher. Examples of the high-viscosity component include, but are not limited to, monomers, polymerizable oligomers, polymerizable polymers, solvents, and polymers. Among these high-viscosity components, monomers having active-energy-ray-curability are preferable. Moreover, in terms of inkjet dischargeability, low-molecular-weight monomers are preferable. Furthermore, it is preferable that the high-viscosity component have a viscosity of 1,000 mPa·s or higher at 25 degrees C.

For example, the viscosity and content of the high-viscosity component may be adjusted. Even if the viscosity as an ink remains almost the same, a second ink containing a high-viscosity component having a higher viscosity can form a liquid droplet that hardly submerges into a first layer but can land as if it were crushed on the surface. This makes it easier to satisfy all of coverage, density, and image retention over time. It is rather preferable that the content of the high-viscosity component in the ink be higher for a landing behavior, but this may increase the viscosity of the ink. Hence, adjustment may be appropriately effected by the viscosity of the high-viscosity component. A component having a high viscosity is effective even if it is in a small amount. The high-viscosity component is not particularly limited and may be appropriately selected depending on the intended purpose. Examples of the high-viscosity component include, but are not limited to, (meth)acrylates having a dipentaerythritol skeleton, such as dipentaerythritol hexaaerylate, dipentaerythritol pentaacrylate, and caprolactone-modified dipentaerythritol hexaacrylate; (meth)acrylates having a pentaerythritol skeleton, such as pentaerythritol tetraacrylate, pentaerythritol triacrylate, and EO-modified pentaerythritol triacrylate: (meth)acrylates having an isocyanurate skeleton, such as isocyanuric acid triacrylate and ethoxylated isocyanuric acid triacrylate; (meth)acrylates having a ditrimethylolpropane skeleton, such as ditrimethylolpropane tetraacrylate: (meth)acrylates having a bisphenol A skeleton, such as EO-modified bisphenol A di(meth)acrylate; (meth)acrylates having a hydrogenated bisphenol A skeleton, such as EO-modified hydrogenated bisphenol A di(meth)acrylate: and urethane acrylate, epoxy acrylate, polyester acrylate, polyether acrylate, acrylic acrylate, silicone acrylate, urethane resins, polyester resins, polyether resins, acrylic resins, and silicone resins. Among these high-viscosity components, (meth)acrylates having a dipentaerythritol skeleton and (meth)acrylates having an isocyanurate skeleton, which particularly have a high viscosity and a low molecular weight, are preferable. A higher viscosity enables a more effective landing behavior in the method for producing a laminate of the present disclosure, and a lower molecular weight enables a better dischargeability. Above all, in terms of viscosity, molecular weight, and costs, dipentaerythritol hexaacrylate is preferable.

<Low-Viscosity Component>

The low-viscosity component contained in the second ink is not particularly limited so long as the viscosity of the low-viscosity component at 25 degrees C. is 30 mPa·s or lower. Examples of the low-viscosity component include, but are not limited to, monomers, polymerizable oligomers, polymerizable polymers, or solvents, and polymers. Among these low-viscosity components, a component having active-energy-ray-curability is preferable. Because the second ink has a viscosity of 40 mPa·s or lower at 25 degrees C. and the high-viscosity component has a viscosity of 500 mPa·s or higher at 25 degrees C. and is more effective in a higher amount, it is preferable that the low-viscosity component of the second ink have a lower viscosity and be a difunctional monomer or a monofunctional monomer, or a component free of a functional group such as an aromatic series and a hydroxyl group, and a heteroatom. The low-viscosity component is not particularly limited and may be appropriately selected depending on the intended purpose. Examples of the low-viscosity component include, but are not limited to, di(meth)acrylates having a glycol skeleton, such as dipropylene glycol diacrylate and tripropylene glycol diacrylate; alkanediol diacrylates such as hexanediol diacrylate and nonanediol diacrylate; aliphatic monofunctional monomers such as cyclohexyl acrylate, isobornyl acrylate, and 3,3,5-trimethyl cyclohexyl acrylate: ether-based monofunctional monomers such as cyclic trimethylolpropane formal acrylate, tetrahydrofurfuryl acrylate, and methoxy triethylene glycol; and organic solvents and water.

<Surfactant>

It is preferable that the first ink and the second ink constituting the ink set of the present disclosure contain a surfactant, or a material that controls surface tension in a small amount of addition.

The material that controls surface tension in a small amount of addition is a material intended for both of General formulae (1) and (2) to be satisfied at the same time, and needs not necessarily be added when General formulae (1) and (2) are satisfied naturally. The first ink and the second ink have large surface tension differences between most of the components thereof, and some kinds of components among the components can balance the surface tensions of the inks. That is, it is preferable that the first ink or the second ink contain a surfactant or a quasi-surfactant that balances the surface tensions of the first ink and the second ink.

The surfactant may be appropriately selected considering the surface tension relationship between the first ink and the second ink. Examples of the surfactant include, but are not limited to, fluorine-based surfactants, silicone-based surfactants, and organic surfactants.

The material that controls surface tension in a small amount of addition is not particularly limited and may be appropriately selected depending on the intended purpose. Examples of the material that controls surface tension in a small amount of addition include, but are not limited to, low-surface-tension monomers such as long-chain alkyl acrylate.

<Monomer>

When the first ink and the second ink constituting the ink set of the present disclosure are curable inks, the first ink and the second ink contain a monomer. The monomer is a compound that produces active species in response to heating, or active energy rays (e.g., ultraviolet rays and electron beams) and thereby undergoes a polymerization reaction and cures. Examples of the monomer include, but are not limited to, multifunctional monomers and monofunctional monomers depending on the number of functional groups.

The monomer needs at least be a polymerizable compound. Examples of the monomer may include, but are not limited to, polymerizable oligomers and polymerizable polymers (macromonomers).

The kind of the monomer contained in the first ink and the second ink is not particularly limited and may be appropriately selected depending on the intended purpose, except that the second ink contains the high-viscosity component. In terms of viscosity as described above, a multifunctional monomer is often selected as the high-viscosity component. However, the high-viscosity component may be a monofunctional monomer, and needs not be a monomer.

One kind of a monomer may be used alone or two or more kinds of monomers may be used in combination. A plurality of kinds may be used in combination, such as a combination of a plurality of kinds of only monofunctional monomers, or a combination of a plurality of kinds of multifunctional monomers and a plurality of kinds of monofunctional monomers.

<Polymerization Initiator>

The first ink and the second ink constituting the ink set of the present disclosure may contain a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds. Among these radical polymerization initiators, acylphosphine oxide compounds are preferable.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof. The polymerization initiator may be a liquid or a solid. A solid is preferable.

<Particles>

The particles are not particularly limited and may be appropriately selected depending on the intended purpose. Examples of the particles include, but are not limited to, pigments.

It is preferable that the first ink and the second ink constituting the ink set of the present disclosure, particularly the second ink contain particles such as a pigment as an insoluble component. Compared with solution components, particles such as a pigment do not tend to mix and diffuse in a laminate, but the conditions or placement of the particles such as a pigment can be maintained over time. Other than a pigment, for example, inorganic particles may be used in order to improve hardness, or resin particles may be used in order to form a laminate of resin films.

As the pigment, various pigments may be used that impart black, white, magenta, cyan, yellow, green, orange, and gloss colors such as gold and silver, depending on the intended purpose of the inks and requisite properties thereof. A content of the pigment is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the first ink and the second ink constituting the ink set do not necessarily contain a pigment but can be clear and colorless. In such a case, for example, such clear and colorless inks are good for an overcoating layer to protect an image, or for an undercoat layer to facilitate color development of an image. Particularly, in terms of color developability, it is more preferable that the second ink contain a color pigment and the first ink contain a white pigment or be colorless.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion.

Examples of the inorganic particles include, but are not limited to, silica particles and zirconia particles. The amount of addition of the inorganic particles is preferably from 5% by mass through 20% by mass. When the amount of addition of the inorganic particles is less than 5% by mass, the effects of improving hardness and suppressing blocking may not often be obtained. When the amount of addition of the inorganic particles is 20% by mass or greater, inkjet dischargeability may be degraded.

Examples of the resin particles include, but are not limited to, urethane resins, acrylic resins, styrene resins, polyester resins, polyether resins, silicone resins, or composite resins of these resins. The resin particles may be present as particles even after a laminate is formed, or may form a resin film through melting by, for example, heating.

<Solvent>

The method for producing a laminate of the present disclosure may take a long time for, for example, drying because the method can retain a laminate and images thereof over time, and the first ink and the second ink constituting the ink set of the present disclosure may contain water or an organic solvent but had better be free of water or an organic solvent if possible. Volatilization during drying tends to induce fluidization that contributes to the layer structure and images of the laminate coming out of order. The composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The first ink and the second ink constituting the ink set of the present disclosure optionally contain other known components. The other known components are not particularly limited. Specific examples thereof include, but are not limited to, known articles such as polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Inks>

The first ink and the second ink constituting the ink set of the present disclosure can be prepared by using the components described above. The preparation devices and conditions are not particularly limited. For example, the inks can be prepared by subjecting a polymerizable monomer, a dispersion medium such as an organic solvent and water, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, a dispersion medium such as an organic solvent and water, an initiator, a polymerization inhibitor, and a surfactant.

<Application Field>

The application field of the ink set of the present disclosure is not particularly limited. It can be applied to any field where inks and active-energy-ray-curable compositions are used. For example, the ink set is selected to a particular application and used for a resin for processing, a paint, an adhesive, an insulant, a releasing agent, a coating material, a sealing material, various resists, and various optical materials.

In addition, the present disclosure includes processed products obtained by processing structures having a laminated, which is formed of the ink set of the present disclosure, on a substrate. The processed product is fabricated by, for example, heat-drawing and punching a cured material or structure having a sheet-like form or film-like form. Examples thereof include, but are not limited to, products of molding performed after surface-decoration, such as gauges or operation panels of vehicles, office machines, electric and electronic machines, and cameras.

The substrate is not particularly limited. It can suitably be selected to a particular application. Examples thereof include, but are not limited to, paper, fiber, fabrics, leather, metal, plastic, glass, wood, ceramic, or composite materials thereof. Of these, plastic substrates are preferred in terms of processability.

<Ink Set Stored Container>

The stored container having stored therein the ink set of the present disclosure contains the first ink and the second ink and is suitable for the applications as described above. For example, a container that stores the inks of the present disclosure can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

(Method for Producing Laminate)

A method for producing a laminate of the present disclosure is a method for producing a laminate including a first layer forming step of applying a first ink on a base material, a laminating step of applying a second ink on a first layer formed of the first ink by an inkjet method to form a laminate, and a solidifying step of solidifying the laminate formed of the first ink and the second ink by curing or drying.

The method is substantially free of a solidifying step between the first layer forming step and the laminating step. The first layer in the laminating step is a liquid, and has a viscosity of from 5 mPa·s through 40 mPa·s at 25 degrees C.

<First Layer Forming Step>

The first layer forming step is a step of forming a first layer formed of a first ink, and is a first layer forming step of applying the first ink on a base material.

The method for applying the first ink is not particularly limited and may be appropriately selected depending on the intended purpose. Examples of the method include, but are not limited to, coating methods such as a knife coating method, a nozzle coating method, a die coating method, a lip coating method, a comma coating method, a gravure coating method, a rotary screen coating method, a reverse roll coating method, a roll coating method, a spin coating method, a kneader coating method, a bar coating method, a blade coating method, a casting method, a dipping method, and a curtain coating method, and an inkjet method. In the method for producing a laminate of the present disclosure, it is not needed that the first ink be a solid or have a high viscosity, but it is possible to form a laminate while the first layer is remaining as a low-viscosity liquid, and to use a low-viscosity ink. Therefore, it is possible to employ an inkjet method.

<Laminating Step>

The laminating step is a laminating step of applying a second ink on a first layer formed of the first ink by an inkjet method, to form a laminate.

In the laminating step of the present disclosure, it is not needed that the first layer have been solidified, and a solidifying step is substantially free between the first layer forming step and the laminating step. Therefore, the first layer in the laminating step is a liquid, and has a viscosity of from 5 mPa·s through 40 mPa·s at 25 degrees C.

In order to laminate a layer on a liquid-state first layer, a contactless laminating method is preferable, it is preferable that a landing droplet have a low impact, and an inkjet method that has a small droplet size and can form an image is preferable.

<Solidifying Step>

The solidifying step is a step of solidifying a laminate formed of the first ink and the second ink by curing or drying. Examples of the solidifying step include, but are not limited to, solidification by curing by active energy rays, curing by heating, and evaporation of water or a solvent by heating. Among these methods, curing by active energy rays is preferable because curing by active energy rays is not time-consuming and does not involve, for example, evaporation that tends to generate convection. On the other hand, because the method for producing a laminate of the present disclosure tends to retain images and structure of the laminate over time, it is also possible to employ curing by heating and drying by evaporation.

(Printing Apparatus)

A printing apparatus used in the method for producing a laminate of the present disclosure includes a first ink applying unit configured to apply a first ink on a base material to form a first layer, a second ink discharging unit configured to apply a second ink on a first layer formed of the first ink by an inkjet method to form a laminate, and a solidifying unit configured to solidify the laminate formed of the first ink and the second ink by curing or drying, and is loaded with the ink set of the present disclosure.

The first ink applying unit is preferably of an inkjet unit like the second ink discharging unit. The inkjet discharging method is not particularly limited, and examples of the inkjet discharging method include, but are not limited to, a continuous jetting method and an on-demand method. Examples of the on-demand method include, but are not limited to, a piezo method, a thermal method, and an electrostatic method. The solidifying unit may be a heater, but is preferably an active energy ray irradiator.

FIG. 1 is a diagram illustrating a printing apparatus equipped with an inkjet discharging device. Printing units 23a and 23b respectively having ink cartridges containing the first ink and the second ink and discharging heads discharge the inks onto a base material 22 fed from a supplying roller 21. Thereafter, a light source 24 configured to cure the inks emits active energy rays to the inks, thereby curing the inks to form a laminate. Thereafter, the base material 22 is conveyed to a processing unit 25 and a printed matter reeling roll 26. Each of the printing units 23a and 23b may have a heating mechanism to make the viscosity of the ink low at the ink discharging portion. Moreover, in another embodiment of the present disclosure, a mechanism may optionally be included to cool down the base material to around room temperature in a contact or non-contact manner. In addition, the inkjet recording method may be either of serial methods or line methods. The serial methods include discharging an ink onto a base material by moving the head while the base material intermittently moves according to the width of a discharging head. The line methods include discharging an ink onto a base material from a discharging head held at a fixed position while the base material continuously moves.

The base material 22 is not particularly limited and may be appropriately selected depending on the intended purpose. The base material 22 may take, for example, a film form, a sheet form, or a plate form. The printing apparatus may have a one-side printing configuration and/or a two-side printing configuration.

The laminate produced with the ink set of the present disclosure includes not only articles having printed images on a plain surface of conventional paper, resin film, etc., but also articles having printed images on a rough surface.

Figure 2:
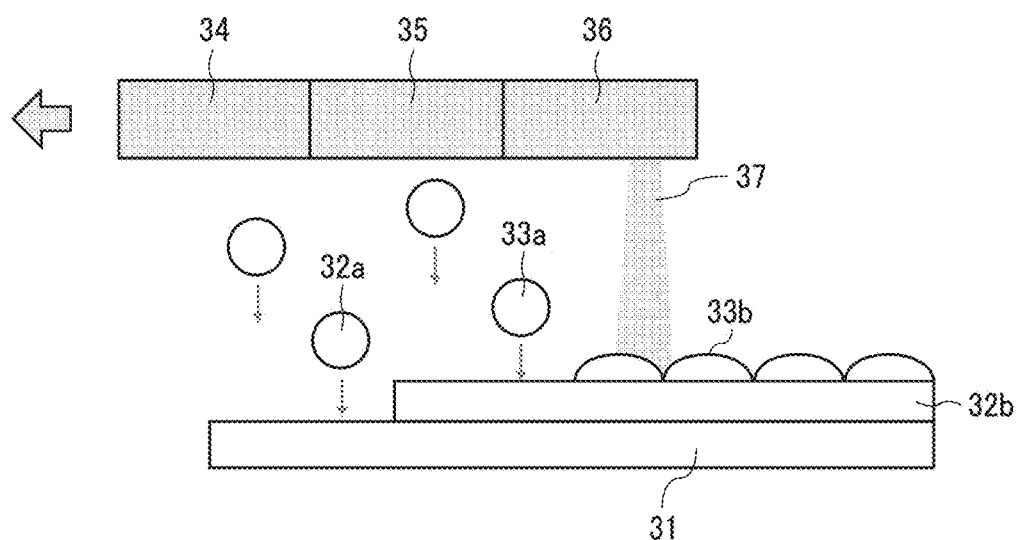
FIG. 2 is a schematic diagram illustrating a state of a laminate being formed using an inkjet discharging apparatus including a plurality of inkjet heads and a UV light source on a compartmented carriage.

FIG. 2 is a schematic diagram illustrating a state of a laminate being formed using an inkjet discharging apparatus including a plurality of inkjet heads and a UV light source on a compartmented carriage. In order of left to right, FIG. 2 illustrates a step in which a first ink 32a discharged from a first discharging unit 34 loaded with the first ink lands on a base material 31 to form a first layer 32b formed of the first ink 32a, a laminating step in which a second ink 33a discharged from a second discharging unit 35 loaded with the second ink lands on the first layer 32b formed of the first ink to form a liquid droplet or second layer 33b formed of the second ink 33a on the first layer 32b, to form a laminate, and a solidifying step in which the inks are cured with active energy rays 37 emitted from an active energy ray irradiator 36.

It is preferable that an inkjet printing apparatus include the first discharging unit 34 configured to discharge the first ink 32a, the second discharging unit 35 configured to discharge the second ink 33a, and the active energy ray irradiator 36 configured to cure the inks by irradiation with active energy rays 37 in this order.

(Laminate)

A laminate obtained by the method for producing a laminate of the present disclosure includes a first layer formed of a first ink and a second layer formed of a second ink, and is free of a definite interface between the first layer and the second layer except for difference in distribution of particles such as a pigment. The present disclosure can obtain a laminate of which images and structure can be retained over time, that can retain, for example, color images in a dot-by-dot separate state, and that nevertheless has an interlayer-merged state that rarely undergoes delamination.

Figure 5:
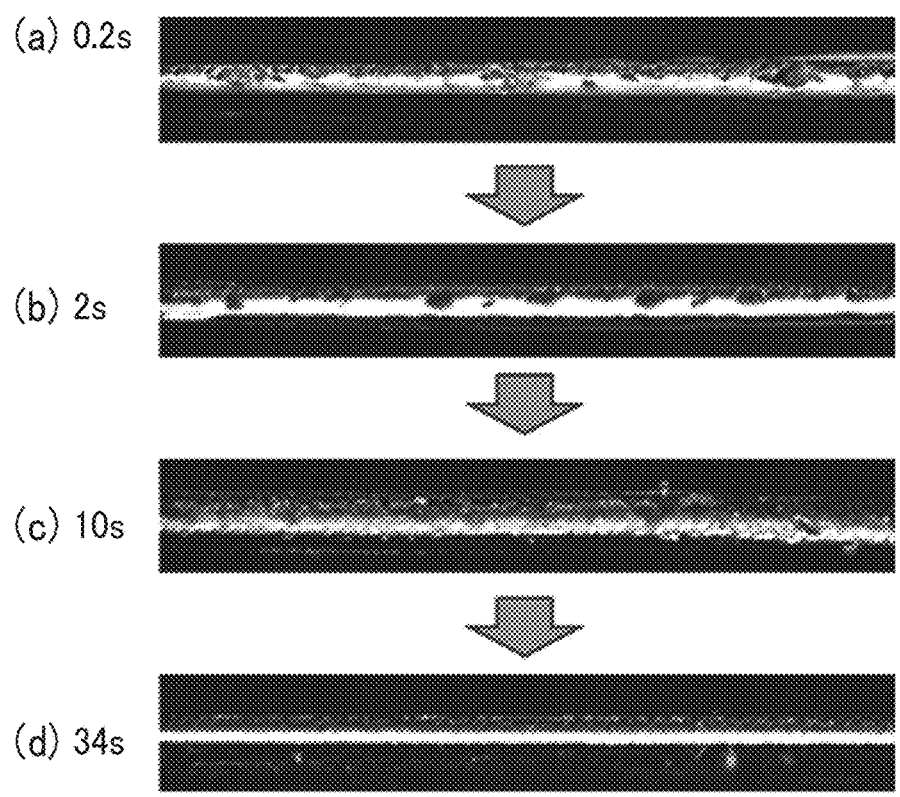
FIG. 5 includes observed images of a cross-section of a laminate in which a second ink is printed at 600 dpi during production of a laminate of Example 1, illustrating changes of a laminate structure over time observed when a period of time until UV irradiation is set to 0.2 seconds, 2 seconds, 10 seconds, and 34 seconds.

The present disclosure can obtain a greater tidiness between the laminated layers as there is a longer time before solidification, and can obtain a laminate that is in-order and smooth between the first and second layers. Shape changes of a laminate after landing of the droplets can be observed by, for example, observation of a cross-section, because it is possible to solidify the droplets instantaneously by using active-energy-ray-curable inks as the ink set of the present disclosure and irradiating the droplets with active energy rays immediately after landing or at any timing after landing (FIG. 5).

Figure 6:
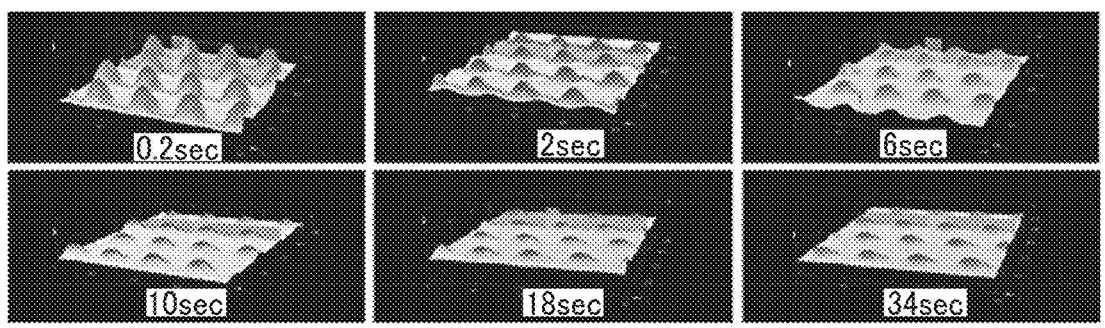
FIG. 6 illustrates 3D images, enlarged ten times in the height direction, of a laminate in which a second ink is printed at 150 dpi during production of a laminate of Example 4, illustrating changes of shapes, or concave or convex of ink droplets over time observed when a period of time until UV irradiation is set to 0.2 seconds, 2 seconds, 6 seconds, 10 seconds, 18 seconds, and 34 seconds.

The laminate obtained by the method for producing a laminate of the present disclosure also includes a laminate in which ink droplets formed of a second ink are arranged in dots on a first layer formed of a first ink. As the placement and shape of the ink droplets formed of the second ink in the laminate obtained, the ink droplets have a semi-elliptical shape convex upward and are placed as if they mounted on the underlying first layer (FIG. 4) or as if they slightly sank (FIG. 3) when the ink droplets are solidified within one second immediately since landing. As the time elapses since landing, the shape convex upward on the surface becomes gentle, and shifts to a shape convex downward but does not sink and submerge. Moreover, the dot diameter does not significantly greatly change (FIG. 6).

According to the exiting method utilizing surface tension, droplets submerge into a lower layer immediately after landing (FIG. 8), or droplets increase in dot diameter over time (FIG. 9) if they do not submerge. The present disclosure can mount ink droplets for forming an upper layer above the lower layer without letting the ink droplets submerge into the lower layer even though the lower layer is in a low-viscosity liquid state, and can maintain the dot diameter. Therefore, the present disclosure can obtain a laminate that satisfies all of coverage, color developability, and image retention over time.

EXAMPLES

The present disclosure will be described below by way of Examples. The present disclosure should not be construed as being limited to these Examples. In Examples, ultraviolet-curable inks were used as inks. This is because ultraviolet curing that can solidify the inks instantaneously was employed in order to observe changes of the multilayer structure of the laminate over time. Water-based inks and solvent-based inks may also be used.

Example 1

—Preparation of Ink—

Acryloyl morpholine (ACMO) (15 parts by mass), 2-hydroxy-3-phenoxypropyl acrylate (M-5700) (15 parts by mass), 4-hydroxybutyl acrylate (4HBA) (30 parts by mass), phenoxyethyl acrylate (PEA) (18 parts by mass), 2,4,6-trimethylbenzoyl-diphenyl-phosphine oxide (TPO) (10 parts by mass), TWIN 4100 serving as a surfactant (0.1 parts by mass), and a titanium oxide pigment serving as an insoluble component (12 parts by mass) were added together and stirred, to obtain an ink 1 of Table 1.

Next, dipropylene glycol diacrylate (DPGDA) (76 parts by mass), dipentaerythritol hexaacrylate (DPHA) (10 parts by mass), 2,4,6-trimethylbenzoyl-diphenyl-phosphine oxide (TPO) (10 parts by mass), RS-76 serving as a surfactant (0.1 parts by mass), and PR122 serving as a magenta pigment (4 parts by mass) were added together and stirred, to obtain an ink 6 of Table 2.

The ink 1 serving as a first ink and the ink 6 serving as a second ink were used for producing a laminate of Example 1.

Examples 2 to 6 and Comparative Examples 1 to 6

—Preparation of Ink—

Inks 2 to 5 and 7 to 14 were prepared as first inks and second inks of Examples 2 to 6 and Comparative Examples 1 to 6 in the same manner as in Example 1, except that unlike in Example 1, the composition and contents were changed as presented in Table 1 and Table 2.

Next, the viscosity and static surface tension of the obtained inks and each component were measured in the manners described below. The results are presented in Table 1 to Table 4.

<Viscosity>

The viscosity was measured by a cone plate rotary viscometer VISCOMETER TVE-22L manufactured by TOKI SANGYO CO., LTD. using a cone rotor (1° 34'×R24) at a temperature of hemathermal circulating water set to 25 degrees C. The number of rotation was normally set to 50 rpm, and appropriately reduced in the event that it would be impossible to measure a component because of its high viscosity.

<Static Surface Tension>

The static surface tension was measured by an automatic surface tensiometer (DY-300, obtained from Kyowa Interface Science Co., Ltd.) by a plate method using a platinum plate at 25 degrees C. The surface tension of a high-viscosity component was calculated by a pendant drop method.

<General Formula (2)>

"Sum of (weight ratios)/Sum of ratios (weight ratio/static surface tension)" (i.e., Formula (1) below) was calculated regarding the components of the first ink and the second ink except the insoluble component, where A represents the content (% by mass) of each component contained in the first ink, B represents the static surface tension (mN/m) of each component contained in the first ink, C represents the content (% by mass) of each component contained in the second ink, and D represents the static surface tension (mN/m) of each component contained in the second ink.

$$\Sigma A/\Sigma(A/B) - \Sigma C/\Sigma(C/D) \qquad \text{Formula (1)}$$

Here, the insoluble component was excluded as being uninfluential, the surfactant was excluded as being poorly influential because of its low weight ratio of 0.1% by mass in Examples here, and a solid component, which was a polymerization initiator containing an aromatic series and a heteroatom, was excluded as having a low surface tension reducing ability.

The difference in "sum of (weight ratios)/sum of ratios (weight ratio/static surface tension)" between the first ink (ink 1) and the second ink (ink 6) of Example 1 was 5.9 mPa·s. An actual difference calculated based on actually measured values of the components of the first ink and the second ink except the surfactant was 6.2 mPa·s, which was very close.

Production of Laminate

Next, laminates were produced using the produced inks 1 to 14 as the first ink and the second ink in the combinations presented in Table 3 and Table 4. Pigments were added appropriately for image evaluation and formed multilayer state evaluation. However, the pigments were not necessarily used in the suitable color combination for actual printed matters. Active energy ray curing was used as the solidifying method. This was for immediately curing the inks and observing behaviors immediately after landing or behaviors at arbitrary timings after landing. Active energy ray curing was not indispensable.

An inkjet discharging apparatus that could be mounted with a plurality of inkjet heads and a UV light source on a compartmented carriage as illustrated in FIG. 2 was mounted with MH5421 (obtained from Ricoh Company, Ltd.) as the inkjet heads and a UV-LED light source having a wavelength of 395 nm as the active energy ray irradiator, and was loaded with curable liquid compositions in the combinations presented in Table 3 and Table 4.

The inkjet discharging apparatus discharged a first ink onto a polycarbonate base substrate (obtained from Mitsubishi Gas Chemical Company, Inc., IUPILON NF-2000, with a thickness of 0.5 mm), subsequently discharged a second ink, an irradiated the inks with UV, to obtain a laminate. The inkjet discharging apparatus discharged the first ink and the second ink within the same scan. For any item having an indication "after 0.2 seconds", UV irradiation was also performed within the same scan in which the inks were discharged. That is, two kinds of inks were discharged and irradiated with UV within one scan. For any item having an indication "after 34 seconds", two kinds of inks were irradiated with UV 34 seconds after they were discharged.

The first ink was printed as a lower layer in the form of a 2 cm square, and the second ink for forming an upper layer was printed in the center in the form of a 1 cm square. The output power of the UV-LED light source having a wavelength of 395 nm was set to an illuminance of 4.5 W/cm2. The travelling speed of the carriage was set to 840 mm/second. The distance from the head configured to discharge the second ink to the UV irradiator was set to 20 cm. The droplet amount per droplet was set to 18 ng. The dot density was set to 600 dpi×600 dpi. Settings were adjusted in a manner that the thickness would be 10 micrometers.

—Evaluation of Laminate—

<Measurement of Covering Ratio>

The center portion of the laminate was observed with a laser microscope (OLS4100, obtained from Olympus Corporation), to obtain a color image and a laser microscopic image. A white ink was used for the lower layer, and a magenta ink was used for the upper layer. If the lower layer were exposed, reflection would be observed in the laser image due to reflection from titanium oxide contained in the white ink. Hence, an exposure ratio could be calculated based on the density gradation in the image. There is a tendency that the covering ratio would be low immediately after landing. Table 3 and Table 4 indicate the covering ratio under the image producing condition of "0.2 seconds" as a period of time until UV irradiation. The covering ratio is preferably 85% or greater, more preferably 95% or greater, and yet more preferably 100%.

A: 100%
B: 95% or greater but less than 100%
BC: 85% or greater but less than 95%
CD: 67% or greater but less than 85%
D: Less than 67%

<Evaluation of Image Retention Over Time>

The first ink was printed as a lower layer in the form of a 2 cm square, and the second ink for forming an upper layer was printed in the center of where the lower layer was printed with a size of a 1 cm square. The images were produced with the period of time until UV irradiation set within a range of from 0.2 seconds through 34 seconds. Seeing an input upper layer image size of 1 cm as the reference, image retention over time was evaluated based on image size change of the upper layer printed portion. There is a tendency that image retention would degrade over time. Table 3 and Table 4 indicate the image size change under the image producing condition of "34 seconds" as a period of time until UV irradiation. A size change after 34 seconds is preferably less than 50% and more preferably less than 20%. A practically usable level is 20% or less. When a size change is 20% or greater but less than 50%, there is a need for producing images by, for example, shortening the period of time until UV irradiation. The image size of the printed portion was the maximum length including not only a densely colored portion of the upper layer colored portion (magenta in Examples here) but also a bled, spread, and thinly colored portion.

B: Less than 20%
C: 20% or greater but less than 50%
D: 50% or greater

<Evaluation of Density>

The magenta image density of the obtained laminate was measured with X-RITE EXACT obtained from X-Rite, Inc. The density may be low due to a low covering ratio immediately after landing or due to film thinning or pigment aggregation over time. Table 3 and Table 4 indicate the density under the image producing conditions of "0.2 seconds" and "34 seconds" as a period of time until UV irradiation. A density of 1.3 or higher is a practically usable level.

—Evaluation of Landing Behavior—

As referential information, evaluation of shape and placement of ink droplets and evaluation of rippling were performed.

<Evaluation of Shape of Ink Droplets>

Figure 7:
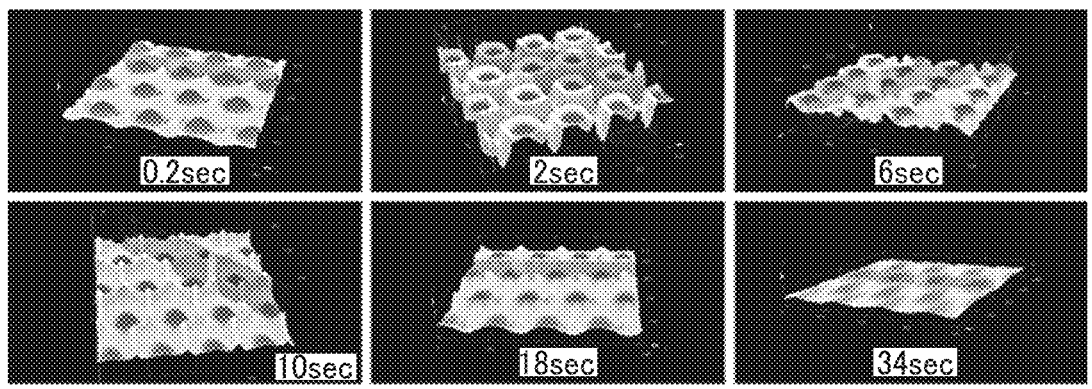
FIG. 7 illustrates 3D images, enlarged ten times in the height direction, of a laminate in which a second ink is printed at 150 dpi during production of a laminate of Example 1, each observed when the period of time until UV irradiation is set to 0.2 seconds, 2 seconds, 6 seconds, 10 seconds, 18 seconds, and 34 seconds, illustrating changes of shapes, or concave or convex of ink droplets over time, and also illustrating an example of rippling between dots.

A laminate was obtained in the same manner as in the method for producing a laminate described above except that the dot density of the second ink for forming an upper layer was changed to 150 dpi×150 dpi. The obtained laminate was cut, and the appearing cross-section was observed with a laser microscope (OLS4100, obtained from Olympus Corporation), to observe the shape of the droplets of the second ink (FIG. 3, FIG. 4, FIG. 8, and FIG. 9). Alternatively, the surface of the obtained laminate was observed with a laser microscope (OLS4100, obtained from Olympus Corporation), to observe whether the surface was concave or convex based on the 3D profile of the surface (FIG. 6 and FIG. 7).

"Convex upward": An ink droplet had a shape having a nearly flat surface at the lower portion and convex at the upper portion.

"Convex downward": An ink droplet had a shape convex at the lower portion and having a nearly flat surface at the upper portion.

"-": A shape that failed to clearly express a convex direction, such as an elliptical shape and a thin film shape.

<Evaluation of Placement of Ink Droplets>

A laminate was obtained in the same manner as in the method for producing a laminate described above except that the dot density of the second ink for forming an upper layer was changed to 150 dpi×150 dpi. The obtained laminate was cut, and the appearing cross-section was observed with a laser microscope (OLS4100, obtained from Olympus Corporation), to observe placement of droplets of the second ink (FIG. 3, FIG. 4, FIG. 8, and FIG. 9).

Figure 3:
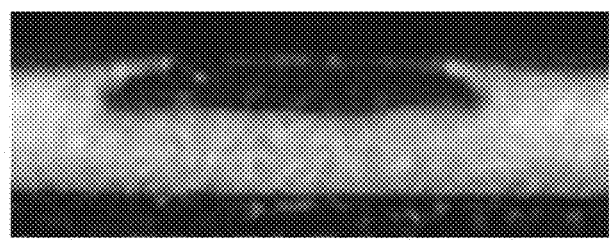
FIG. 3 is an observed image of a cross-section of a laminate in which a second ink is printed at 150 dpi during production of a laminate of Example 1, illustrating an example of a landing behavior of a droplet of the second ink as if it were crushed on a surface of a first layer.
Figure 4:
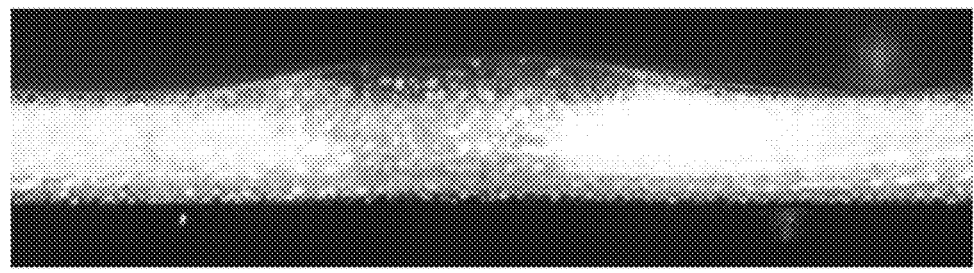
FIG. 4 is an observed image of a cross-section of a laminate in which a second ink is printed at 150 dpi during production of a laminate of Example 4, illustrating an example of a landing behavior of a droplet of the second ink as if it mounted on a surface of a first layer.
Figure 8:
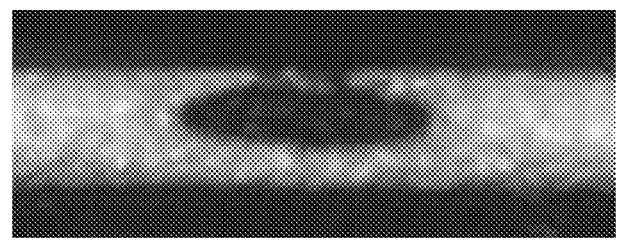
FIG. 8 illustrates an example of a submerging landing behavior of an ink droplet according to an existing method.
Figure 9:
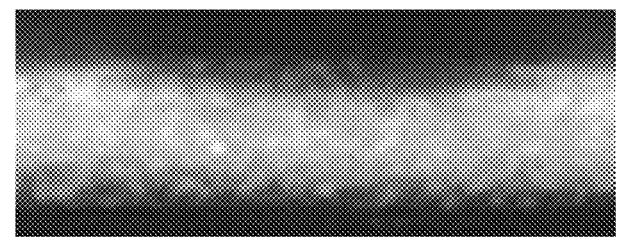
FIG. 9 illustrates an example of a landing behavior of an ink droplet spreading over a surface according to an existing method.

A: The first layer was not dented, and the ink droplets mounted on the liquid surface of the first layer (FIG. 4).
B. Most of the interface at the top of the ink droplets was a gas-liquid interface (the liquid droplets were exposed to the surface) (FIG. 3 and FIG. 9).
C: The ink droplets were present near the surface, but almost covered by the first layer.
D: The ink droplets submerged inside the first layer (FIG. 8).

<Evaluation of Rippling>

A laminate was obtained in the same manner as in the method for producing a laminate described above. The period of time until UV irradiation was set to 0.2 seconds, 2 seconds, 6 seconds, 10 seconds, 18 seconds, and 34 seconds. The obtained laminate was observed with a laser microscope (OLS4100, obtained from Olympus Corporation), to observe a 3D shape. For evaluation of rippling, the maximum amplitude obtained among the laminates produced under the period of time until UV irradiation conditions described above was evaluated. In some case, there was a strong tendency that the amplitude would be high when the dot density of the second ink for forming an upper layer was 150 dpi×150 dpi (FIG. 6 and FIG. 7). There was a tendency that the amplitude would be low when the dot density was 600 dpi×600 dpi.

B: No ripples were observed, or the amplitude was lower than 1 micrometer (FIG. 6).
C: Ripples were observed, and the amplitude was 1 micrometer or higher but lower than 5 micrometers.
D: The amplitude was 5 micrometers or higher (FIG. 7).

TABLE 1

| | | Component | Viscosity | Surface tension | Ink 1 | Ink 2 | Ink 3 | Ink 4 | Ink 5 |
|---|---|---|---|---|---|---|---|---|---|
| Ink configuration (First ink) | Liquid component | ACMO | 12 | 45 | 15 | 13 | 13 | | |
| | | M-5700 | 170 | 42 | 15 | 13 | 13 | | |
| | | 4HBA | 6 | 36 | 30 | 26 | 26 | | |
| | | PEA | 8 | 38 | 18 | 16 | 16 | 18 | 18 |
| | | DPGDA | 8 | 32 | | 10 | | | |
| | | IBOA | 8 | 33 | | | 10 | 22 | 22 |
| | | CTFA | 10 | 35 | | | | 20 | 20 |
| | | 2EHA | 2 | 28 | | | | 8 | 8 |
| | | HBPE-4 | 550 | 40 | | | | 10 | 10 |
| | Solid component | TPO | — | — | 10 | 10 | 10 | 10 | 10 |
| | Surfactant | TWIN4100 | — | — | 0.1 | 0.1 | 0.1 | 0.1 | |
| | | TWIN4000 | — | — | | | | | 0.1 |
| | Insoluble component | TiO2 | — | — | 12 | 12 | 12 | 12 | 12 |
| | | Total | | | 100.1 | 100.1 | 100.1 | 100.1 | 100.1 |

TABLE 1-continued

|  |  | Component | Viscosity | Surface tension | Ink 1 | Ink 2 | Ink 3 | Ink 4 | Ink 5 |
|---|---|---|---|---|---|---|---|---|---|
| Ink property | Viscosity | Ink |  |  | 22 | 19 | 19 | 20 | 20 |
|  | Surface tension | Ink |  |  | 33 | 34 | 34 | 32 | 27 |
|  |  | Harmonic mean |  |  | 39 | 38 | 38 | 35 | 35 |

TABLE 2

|  |  | Component | Viscosity | Surface tension | Ink 6 | Ink 7 | Ink 8 | Ink 9 | Ink 10 | Ink 11 | Ink 12 | Ink 13 | Ink 14 |
|---|---|---|---|---|---|---|---|---|---|---|---|---|---|
| Ink configuration (Second ink) | High-viscosity component | DPHA | 7,000 | 44 | 10 |  |  |  | 10 |  |  |  |  |
|  |  | PETA | 950 | 40 |  | 14 |  |  |  |  |  |  |  |
|  |  | HBPE-4 | 550 | 40 |  |  | 16 |  |  |  |  |  |  |
|  | Liquid component (including low-viscosity component) | TMPTA | 80 | 33 |  |  |  | 20 |  | 20 | 20 | 20 | 20 |
|  |  | DPGDA | 8 | 32 | 76 | 72 | 70 | 56 | 56 | 40 | 40 | 40 | 40 |
|  |  | ACMO | 12 | 45 |  |  |  | 10 | 20 | 26 | 26 | 26 | 26 |
|  | Solid component | TPO | — | — | 10 | 10 | 10 | 10 | 10 | 10 | 10 | 10 | 10 |
|  | Surfactant | RS-76 | — | — | 0.1 | 0.1 | 0.1 | 0.1 | 0.1 |  | 0.1 |  |  |
|  |  | GLIDE432 | — | — |  |  |  |  |  | 0.1 |  |  |  |
|  |  | FLOW425 | — | — |  |  |  |  |  |  |  | 0.1 |  |
|  |  | WET500 | — | — |  |  |  |  |  |  |  |  | 0.1 |
|  | Insoluble component | PR122 | — | — | 4 | 4 | 4 | 4 | 4 | 4 | 4 | 4 | 4 |
|  |  | Total |  |  | 100.1 | 100.1 | 100.1 | 100.1 | 100.1 | 100.1 | 100.1 | 100.1 | 100.1 |
| Ink property | Viscosity | Ink |  |  | 28 | 27 | 27 | 26 | 26 | 26 | 26 | 26 | 26 |
|  |  | High-viscosity component |  |  | 7,000 | 950 | 550 | 80 | 7,000 | 80 | 80 | 80 | 80 |
|  | Surface tension | Ink |  |  | 30 | 30 | 30 | 29 | 29 | 22 | 29 | 28 | 35 |
|  |  | Harmonic mean |  |  | 33 | 33 | 34 | 34 | 36 | 35 | 35 | 35 | 35 |

TABLE 3

|  |  |  |  | Ex. 1 | Ex. 2 | Ex. 3 | Ex. 4 | Ex. 5 | Ex. 6 |
|---|---|---|---|---|---|---|---|---|---|
| Configuration of laminate | Ink set | First ink |  | Ink 1 | Ink 1 | Ink 1 | Ink 2 | Ink 3 | Ink 4 |
|  |  | Second ink |  | Ink 6 | Ink 7 | Ink 8 | Ink 6 | Ink 6 | Ink 6 |
| Ink property | Viscosity | First ink | Ink | 22 | 22 | 22 | 19 | 19 | 20 |
|  |  | Second ink | Ink | 28 | 27 | 27 | 28 | 28 | 28 |
|  |  |  | High-viscosity component | 7,000 | 950 | 550 | 7,000 | 7,000 | 7,000 |
|  | Surface tension | First ink | Ink | 33 | 33 | 33 | 34 | 34 | 32 |
|  |  |  | Harmonic mean | 39 | 39 | 39 | 38 | 38 | 35 |
|  |  | Second ink | Ink | 30 | 30 | 30 | 30 | 30 | 30 |
|  |  |  | Harmonic mean | 33 | 33 | 34 | 33 | 33 | 33 |
|  | Surface tension difference | First – Second | Ink | 3.7 | 3.7 | 3.7 | 4.0 | 4.1 | 2.5 |
|  |  |  | Harmonic mean | 5.9 | 5.9 | 5.7 | 4.8 | 4.9 | 1.3 |
| Image quality of laminate | Covering ratio | After 0.2 seconds |  | A | A | B | B | B | BC |
|  | Image retention | After 34 seconds |  | B | B | C | B | B | B |
|  | Density | After 0.2 seconds |  | 2 | 1.8 | 1.6 | 1.8 | 1.7 | 1.5 |
|  |  | After 34 seconds |  | 2 | 1.7 | 1.6 | 1.6 | 1.6 | 1.6 |
| (reference) Landing behavior | Ink droplet (after 0.2 seconds) | Shape |  | Convex upward | Convex upward | — | Convex upward | Convex upward | — |
|  |  | Placement |  | B: Surface | B: Surface | B: Surface | A: on liquid surface | B: Surface | B: Surface |
|  | Rippling | 600 dpi |  | B | B | B | B | B | B |

TABLE 4

|  |  |  |  | Comp Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Configuration of laminate | Ink set | First ink | | Ink 1 | Ink 4 | Ink 4 | Ink 4 | Ink 5 | Ink 5 |
| | | Second ink | | Ink 9 | Ink 10 | Ink 11 | Ink 12 | Ink 13 | Ink 14 |
| Ink property | Viscosity | First ink | Ink | 22 | 20 | 20 | 20 | 20 | 20 |
| | | Second ink | Ink | 26 | 26 | 26 | 26 | 26 | 26 |
| | | | High-viscosity component | 80 | 7,000 | 80 | 80 | 80 | 80 |
| | Surface tension | First ink | Ink | 33 | 32 | 32 | 32 | 27 | 27 |
| | | | Harmonic mean | 39 | 35 | 35 | 35 | 35 | 35 |
| | | Second ink | Ink | 29 | 29 | 22 | 29 | 28 | 35 |
| | | | Harmonic mean | 34 | 36 | 35 | 35 | 35 | 35 |
| | Surface tension difference | First – Second | Ink | 4.2 | 3.0 | 10.0 | 3.0 | −1.0 | −8.0 |
| | | | Harmonic mean | 5.8 | −1.0 | −0.7 | −0.7 | −0.7 | −0.7 |
| Image quality of laminate | Covering ratio | After 0.2 seconds | | CD | CD | A | CD | D | D |
| | Image retention | After 34 seconds | | C | B | D | C | B | B |
| | Density | After 0.2 seconds | | 1.3 | 1.4 | 1.6 | 1.2 | 1 | 0.6 |
| | | After 34 seconds | | 1.5 | 1.6 | 1.2 | 1.5 | 1.2 | 0.8 |
| (reference) Landing behavior | Ink droplet (after 0.2 seconds) | Shape | | Convex downward | Convex upward | —: Thin film | —: Elliptical | —: Elliptical | —: Elliptical |
| | | Placement | | B: Surface | B: Surface | B: Surface | C: Surface | D: Inside | D: Inside |
| | Rippling | 600 dpi | | B | B | B | B | B | B |

In Examples 1 to 3 and Comparative Example 1 among which the viscosity of the high-viscosity component of the second ink was varied, the covering ratio, image retention, and the density were better as the viscosity of the high-viscosity component was higher. In terms of the landing behavior, as the viscosity of the high-viscosity component was higher, an ink droplet shape that was convex upward was more often obtained, whereas rippling as illustrated in FIG. 7 was more often observed during printing at a low dot density (150 dpi).

In Examples 1 and 6 and Comparative Example 2 among which the difference between the first ink and the second ink in harmonic mean of the weight ratio/static surface tension values of the components of the inks was different, the covering ratio and the density were better as the difference was greater.

In Examples 4 and 5 in which the inks 2 and 3 obtained by adding monomers having almost equally low surface tensions to the ink 1 were prepared as the first ink, the surface tensions of the inks 2 and 3 were also almost equal. However, in Example 4 (ink 2) in which DPGDA, which was a component (C) having a low surface tension among the components constituting the second ink, was added to the first ink, a landing behavior of an ink droplet as if it mounted on the liquid surface as illustrated in FIG. 6 was obtained, and rippling as illustrated in FIG. 7, which occurred in Example 1, was suppressed. On the other hand, in Example 5 (ink 3) in which IBOA, which was a component having a low surface tension and not included among the components constituting the second ink, was added to the first ink, an ink shape convex upward was obtained, but a landing behavior of an ink droplet as if it mounted on the liquid surface was not obtained and rippling that occurred in Example 1 was not suppressed, either.

In Comparative Examples 3 to 6, the second ink was free of a high-viscosity component, the difference between the inks in harmonic means of the static surface tensions of the components was not large, and the inks have different surface tensions. In Comparative Example 3, an instantaneously floating and spreading landing behaving was observed, the image size increased over time, and the density degraded over time. In Comparative Examples 4 and 5, an ink droplet submerged immediately after landing, but was able to float over time and maintain the image size. In Comparative Example 6, an ink droplet remained submerged over time. The ink surface tension difference range of Comparative Examples 4 and 5 was a balanced range. In Comparative Examples 4 and 5, an ink droplet submerged immediately after landing, whereas in Examples 1 to 6, an ink droplet did not submerge immediately after landing and the covering ratio and the density were high immediately after landing.

The details of the components used in Examples and Comparative Examples of Table 1 and Table 2 are as follows.

<<Liquid Components>>
<Low-Viscosity Component>
  ACMO: Acryloyl morpholine, obtained from KJ Chemicals Corporation, ACMO
  4HBA: 4-Hydroxybutyl acrylate, obtained from Osaka Organic Chemical Industry Ltd., 4-HBA
  PEA: Phenoxyethyl acrylate, obtained from Osaka Organic Chemical Industry Ltd., VISCOAT #192
  DPGDA: Dipropylene glycol diacrylate, obtained from Shin-Nakamura Chemical Co., Ltd., APG-100
  IBOA: Isobornyl acrylate, obtained from Osaka Organic Chemical Industry Ltd., IBXA
  CTFA: Cyclic trimethylolpropane formal acrylate, obtained from Osaka Organic Chemical Industry Ltd., VISCOAT #200
  2EHA: 2-Ethylhexyl acrylate, obtained from Toagosei Co., Ltd., 2-ethyl hexyl acrylate
<High-Viscosity Component>
  DPHA: Dipentaerythritol hexaacrylate, obtained from Nippon Kayaku Co., Ltd., KAYARAD DPHA PETA: Pentaerythritol triacrylate, obtained from DKS Co., Ltd., PET-3
HBPE-4: EO-modified hydrogenated bisphenol A diacrylate, obtained from DKS Co., Ltd., HBPE-4
<Other Liquid Components>
M-5700: 2-Hydroxy-3-phenoxypropyl acrylate, obtained from Toagosei Co., Ltd., M-5700
TMPTA: Trimethylolpropane triacrylate, obtained from DKS Co., Ltd., TMPT
<Solid Component>
TPO: 2,4,6-Trimethyl benzoyl-diphenyl-phosphine oxide, obtained from IGM Corporation, OMNIRAD TPO H
<Surfactant>
TWIN 4000: obtained from Evonik Industries AG, TEGO TWIN 4000
TWIN 4100: obtained from Evonik Industries AG, TEGO TWIN 4100
RS-76: obtained from DIC Corporation, MEGAFAC RS-76-NS
GLIDE 432: obtained from Evonik Industries AG, TEGO GLIDE 432
FLOW 425: obtained from Evonik Industries AG, TEGO FLOW 425
WET 500: obtained from Evonik Industries AG, TEGO WET 500
<<Insoluble Component>>
<Particles>
TiO2: titanium oxide (a pigment for a white ink)
PR122: Pigment Red 122 (a pigment for a magenta ink)
Aspects of the present disclosure are, for example, as follows.
<1> an Ink Set Including:
a first ink; and
a second ink,
wherein the second ink contains a high-viscosity component having a viscosity of 500 mPa·s or higher at 25 degrees C., and a low-viscosity component having a viscosity of 30 mPa·s or lower at 25 degrees C.,
a static surface tension γ1 (mN/m) of the first ink and a static surface tension γ2 (mN/m) of the second ink satisfy General formula (1) below, $$-1 \text{ (mN/m)} \leq \gamma 1 - \gamma 2 \leq 5 \text{ (mN/m)} \quad \text{General formula (1)},$$

and
a content A (% by mass) of each component contained in the first ink, a static surface tension B (mN/m) of each component contained in the first ink, a content C (% by mass) of each component contained in the second ink, and a static surface tension D (mN/m) of each component contained in the second ink satisfy General formula (2) below, $$\Sigma A / \Sigma (A/B) - \Sigma C / \Sigma (C/D) \geq 0 \text{ (mN/m)} \quad \text{General formula (2)}$$

<2> the Ink Set According to <1>,
wherein a viscosity of the first ink or the second ink, or both is 5 mPa·s or higher but 40 mPa·s or lower.
<3> the Ink Set According to <1> or <2>,
wherein the viscosity of the high-viscosity component at 25 degrees C. is 1,000 mPa·s or higher.
<4> the Ink Set According to any One of <1> to <3>,
wherein the content A (% by mass) of each component contained in the first ink, the static surface tension B (mN/m) of each component contained in the first ink, the content C (% by mass) of each component contained in the second ink, and the static surface tension D (mN/m) of each component contained in the second ink satisfy General formula (3) below, $$\Sigma A / \Sigma (A/B) - \Sigma C / \Sigma (C/D) \geq 3 \text{ (mN/m)} \quad \text{General formula (3)}$$

<5> the Ink Set According to any One of <1> to <4>,
wherein the content A (% by mass) of each component contained in the first ink, the static surface tension B (mN/m) of each component contained in the first ink, the content C (% by mass) of each component contained in the second ink, and the static surface tension D (mN/m) of each component contained in the second ink satisfy General formula (4) below, $$\Sigma A / \Sigma (A/B) - \Sigma C / \Sigma (C/D) \geq 5 \text{ (mN/m)} \quad \text{General formula (4)}$$

<6> the Ink Set According to any One of <1>, <4>, and <5>,
wherein the each component is a liquid component.
<7> the Ink Set According to any One of <1> to <6>,
wherein the first ink or the second ink, or both are active-energy-ray-curable inks.
<8> a Method for Producing a Laminate Using the Ink Set According to any One of <1> to <6>, the method including:
applying the first ink on a base material to form a first layer;
applying the second ink on the first layer to form a second layer; and
solidifying the first layer and the second layer by curing or drying, or both, to form a laminate.
<9> the Method for Producing a Laminate According to <8>,
wherein the first layer in the applying the second ink is a liquid, and has a viscosity of 5 mPa·s or higher but 40 mPa·s or lower at 25 degrees C.

The ink set according to any one of <1> to <7>, and the method for producing a laminate according to <8> or <9> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. An ink set comprising:
a first ink; and
a second ink,
wherein the second ink contains a high-viscosity component having a viscosity of 500 mPa·s or higher at 25 degrees C., and a low-viscosity component having a viscosity of 30 mPa·s or lower at 25 degrees C.,
wherein a static surface tension γ1 (mN/m) of the first ink and a static surface tension γ2 (mN/m) of the second ink satisfy General formula (1) below,

$$-1 \text{ (mN/m)} \leq \gamma 1 - \gamma 2 \leq 5 \text{ (mN/m)} \quad \text{General formula (1)},$$

and
a content A (% by mass) of each component contained in the first ink, a static surface tension B (mN/m) of each component contained in the first ink, a content C (% by mass) of each component contained in the second ink, and a static surface tension D (mN/m) of each component contained in the second ink satisfy General formula (2) below, $$\Sigma A / \Sigma (A/B) - \Sigma C / \Sigma (C/D) \geq 0 \text{ (mN/m)} \quad \text{General formula (2)};$$

wherein the first ink or the second ink, or both are active-energy-ray-curable inks; and wherein the first ink and the second ink are free of water.

2. The ink set according to claim 1,
wherein a viscosity of the first ink or the second ink, or both is 5 mPa·s or higher but 40 mPa·s or lower.

3. The ink set according to claim 1,
wherein the viscosity of the high-viscosity component at 25 degrees C. is 1,000 mPa·s or higher.

4. The ink set according to claim 1,
wherein the content A (% by mass) of each component contained in the first ink, the static surface tension B (mN/m) of each component contained in the first ink, the content C (% by mass) of each component contained in the second ink, and the static surface tension D (mN/m) of each component contained in the second ink satisfy General formula (3) below, $$\Sigma A/\Sigma(A/B)-\Sigma C/\Sigma(C/D) \geq 3 \text{ (mN/m)} \qquad \text{General formula (3).}$$

5. The ink set according to claim 1,
wherein the content A (% by mass) of each component contained in the first ink, the static surface tension B (mN/m) of each component contained in the first ink, the content C (% by mass) of each component contained in the second ink, and the static surface tension D (mN/m) of each component contained in the second ink satisfy General formula (4) below, $$\Sigma A/\Sigma(A/B)-\Sigma C/\Sigma(C/D) \geq 5 \text{ (N/m)} \qquad \text{General formula (4).}$$

6. The ink set according to claim 1,
wherein each component is a liquid component.

7. A method for producing a laminate using the ink set according to claim 1, the method comprising:
applying the first ink on a base material to form a first layer;
applying the second ink on the first layer to form a second layer; and
solidifying the first layer and the second layer by curing or drying, or both, to form a laminate.

8. The method for producing a laminate according to claim 7,
wherein the first layer in the applying the second ink is a liquid, and has a viscosity of 5 mPa·s or higher but 40 mPa·s or lower at 25 degrees C.

9. The ink set according to claim 1, wherein the static surface tension γ1 (mN/m) of the first ink and the static surface tension γ2 (mN/m) of the second ink satisfies the formula: 2.5 (mN/m)≤γ1−γ2≤4.1 (mN/m).

10. The ink set according to claim 2, wherein the viscosity of the second ink is: 27 mPa·s or more and 40 mPa·s or lower.

* * * * *